US006075783A

United States Patent [19]
Voit

[11] Patent Number: 6,075,783
[45] Date of Patent: Jun. 13, 2000

[54] INTERNET PHONE TO PSTN CELLULAR/PCS SYSTEM

[75] Inventor: Eric A. Voit, Baltimore, Md.

[73] Assignee: Bell Atlantic Network Services, Inc., Arlington, Va.

[21] Appl. No.: 08/811,032

[22] Filed: Mar. 6, 1997

[51] Int. Cl.[7] .................................................. H04L 12/56
[52] U.S. Cl. .......................... 370/352; 370/389; 370/392
[58] Field of Search ................................... 709/203, 227, 709/228, 238, 245, 246; 370/401, 338, 389, 392, 352, 353, 356; 455/456; 379/90.01, 93.07, 114, 144, 100.13, 93.08

[56] References Cited

U.S. PATENT DOCUMENTS

| | | |
|---|---|---|
| 4,872,160 | 10/1989 | Hemmady et al. . |
| 4,916,691 | 4/1990 | Goodman . |
| 4,958,341 | 9/1990 | Hemmady et al. . |
| 5,247,571 | 9/1993 | Kay et al. . |
| 5,341,374 | 8/1994 | Lewen et al. . |
| 5,353,331 | 10/1994 | Emery et al. . |
| 5,375,068 | 12/1994 | Palmer et al. . |
| 5,410,754 | 4/1995 | Klotzbach et al. . |
| 5,434,913 | 7/1995 | Tung et al. . |
| 5,490,247 | 2/1996 | Tung et al. . |
| 5,493,568 | 2/1996 | Sampat et al. . |
| 5,506,887 | 4/1996 | Emery et al. . |
| 5,590,133 | 12/1996 | Billström et al. . |
| 5,608,786 | 3/1997 | Gordon . |
| 5,661,790 | 8/1997 | Hsu . |
| 5,724,355 | 3/1998 | Bruno et al. . |
| 5,726,984 | 3/1998 | Kubler et al. . |
| 5,751,961 | 5/1998 | Smyk . |
| 5,774,660 | 6/1998 | Brendel et al. ...................... 395/200.31 |
| 5,777,989 | 7/1998 | McGarvey .............................. 370/254 |
| 5,793,762 | 8/1998 | Penners et al. ......................... 370/389 |
| 5,793,763 | 8/1998 | Mayes et al. ............................ 370/389 |
| 5,838,682 | 11/1998 | Dekelbaum et al. . |
| 5,850,433 | 12/1998 | Rondeau . |
| 5,867,495 | 2/1999 | Elliot et al. ............................. 370/352 |
| 5,883,891 | 3/1999 | Williams et al. . |
| 5,889,774 | 3/1999 | Mirashrafi et al. . |
| 5,901,142 | 5/1999 | Averbuch et al. ....................... 370/329 |
| 5,910,946 | 6/1999 | Csapo ..................................... 370/328 |
| 5,923,659 | 7/1999 | Curry et al. . |
| 5,940,598 | 8/1999 | Strauss et al. . |
| 5,953,322 | 8/1999 | Kimball ................................. 370/328 |

OTHER PUBLICATIONS

"Computer Telephony Over the Internet", Grigonis, Richard, CT and the Net, Mar. 1996.
"Geek of the Week", Karn, Phil et. al., Internet Talk Radio, Mobil IP Networking, Nov. 1993.
"How to Build an Internet PBX", McConnel Brian, http://www.phonezone.com/ip–phone.htm, pp. 1–9.
"Welcome to the Phone Zone", Pacific Telephony Design, http://www.phonezone.com/index2.htm, pp. 1–6.
"Computer Telephony and the Internet", Stylus Innovation, http://www.stylus.com/hvml.htm.
"Innovations in Internet Telephony: The Internet as the Competitor to the POTS Network", Sears, Andrew, Innovation in Internet Telephony: The Internet as the Successor to the POTS Network, Feb. 28, 1996, pp. 1–6.

*Primary Examiner*—Douglas W. Olms
*Assistant Examiner*—Ken Vanderpuye
*Attorney, Agent, or Firm*—McDermott, Will & Emery

[57] ABSTRACT

An Internet telecommunication system in accord with the invention combines the capabilities of the Advanced Intelligent Network (AIN) with those of the internetwork commonly known as the Internet. Functions associated with the Internet Domain Name Server system are enhanced using AIN data and processing. Voice grade telephone calls from a fixed position Internet PC to a roaming wireless personal communication system are enabled. Home Location Register data from the control point of the AIN is forwarded into the Internet Domain Name Server for conditioning the IP lookup and addressing to determine the ultimate call routing. Internet calls may also be automatically completed by the system to addresses other than the ones entered by the caller.

41 Claims, 7 Drawing Sheets

INTERNET PHONE TO PSTN CELLULAR/PCS SYSTEM

TECHNICAL FIELD

The present invention is related to telephone systems and interlinked networks. More particularly, the invention relates to methods and system structures for providing PCS and cellular service and other telephone service over a public packet data network such as the Internet and to providing such services partly through the public telecommunications system including over existing telephone links.

BACKGROUND ART

Attention recently has been directed to implementing voice telephone service over the worldwide network now commonly known as the Internet. The Internet had its genesis in U.S. Government programs funded by the Advanced Research Projects Agency (ARPA). That research made possible national internetworked communication systems. This work resulted in the development of network standards as well as a set of conventions, known as protocols, for interconnecting networks and routing information. These protocols are commonly referred to as TCP/IP. The TCP/IP protocols were originally developed for use only through ARPANET and have subsequently become widely used in the industry. TCP/IP is flexible and robust. TCP takes care of the integrity and IP moves the data.

Internet provides two broad types of services: connectionless packet delivery service and reliable stream transport service. The Internet basically comprises several large computer networks joined together over high-speed data links ranging from ISDN to T1, T3, FDDI, SONET, SMDS, OT1, etc. The most prominent of these national nets are MILNET (Military Network), NSFNET (National Science Foundation NETwork), and CREN (Corporation for Research and Educational Networking) In 1995, the Government Accounting Office (GAO) reported that the Internet linked 59,000 networks, 2.2 million computers and 15 million users in 92 countries. It is presently estimated that the number of Internet users doubles approximately annually.

In simplified fashion the Internet may be viewed as a series of routers connected together with computers connected to the routers. The Information Providers (IPs) constitute the end systems which collect and market the information through their own servers. Access providers are companies such as UUNET, PSI, MCI and SPRINT which transport the information. Such companies market the usage of their networks.

Referring to FIG. 5, there is shown a simplified diagram of the Internet and various types of systems typically connected thereto. Generally speaking the Internet consists of Autonomous Systems (AS) type packet data networks which may be owned and operated by Internet Service Providers (ISPs) such as PSI, UUNET, MCI, SPRINT, etc. Three such AS/ISPs are shown in FIG. 5 at 310, 312 and 314. The Autonomous Systems (ASs) are linked by Inter-AS Connections 311, 313 and 315. Information Providers (IPs) 316 and 318, such as America Online (AOL) and Compuserve, are connected to the Internet via high speed lines 320 and 322, such as T1/T3 and the like. Information Providers generally do not have their own Internet based Autonomous Systems but have or use Dial-Up Networks such as Sprint-Net (X.25), DATAPAC and TYMNET.

By way of current illustration, MCI is both an ISP and an IP, SPRINT is an ISP, and MicroSoft (MSN) is an IP using UUNET as an ISP. Other information providers, such as universities, are indicated in exemplary fashion at 324 and are connected to the AS/ISPs via the same type connections here illustrated as T1 lines 326. Corporate Local Area Networks (LANs), such as those illustrated in 328 and 330, are connected through routers 332 and 334 and high speed data links such as T1 lines 336 and 338. Laptop computers 340 and 342 are representative of computers connected to the Internet via the public switched telephone network (PSTN) and are shown connected to the AS/ISPs via dial up links 344 and 346.

In the addressing scheme of the Internet an address comprises four numbers separated by dots. An example would be 164.109.211.237. This is called the Internet Protocol address or IP address. Each machine on the Internet has a unique number assigned to it which constitutes one of these four numbers. In the address the leftmost number has the greatest weight. By analogy this would correspond to the ZIP code in a mailing address. At times the first two numbers constitute this portion of the address indicating a network or a locale. That network is connected to the last router in the transport path. In differentiating between two computers in the same destination network only the last number field changes. In such an example the next number field 211 identifies the destination router. When the packet bearing the destination address leaves the source router it examines the first two numbers in a matrix table to determine how many hops are the minimum to get to the destination. It then sends the packet to the next router as determined from that table and the procedure is repeated. Each router has a database table that finds the information automatically. This continues until the packet arrives at the destination computer. The separate packets that constitute a message may not travel the same path depending on traffic load. However they all reach the same destination and are assembled in their original order in a connectionless fashion. This is in contrast to connection oriented modes such as frame relay and ATM or voice.

It would be difficult for most people to remember the four separate numbers (sometimes having ten or more digits) comprising each numeric address. In addition numeric IP addresses occasionally change making it even more of a problem for people to keep track of them.

The Domain Name System (DNS) was developed to provide some relief from these problems. In the DNS system words, which are more easily remembered, are used instead of numbers.

An example of a textual Domain Name is Evoit@HUT.MB.COM. Each of the names separated by a dot is called a domain. The significance of each of the domains is the reverse of that of the numeric IP address. In the numeric IP address the most significant numbers were on the left and the least on the right. The textual Domain Name System begins with the least significant on the left and proceeds to the most significant on the right.

The top-level domains, those of the most general significance, are as follows:

1. COM A commercial operation
2. EDU A university, college or other educational institution
3. GOV A government organization
4. MIL A military site
5. ORG Any organization that does not fit into any of the preceding
6. NET A network There are now two-letter domains, each denoting a different country, which are atop the above original domain names. An address ending in "COM.AU," for example, would be a commercial operation in Australia. Over a hundred different countries are now connected to the Internet so the list of two-letter country codes is long and getting longer. Computers associated with the Internet called nameservers convert textual domain names into numeric IP addresses.

One or more companies have recently developed software for use on personal computers to permit two-way transfer of real-time voice information via an Internet data link between two personal computers. In one of the directions, the sending computer converts voice signals from analog to digital format. The software facilitates data compression down to a rate compatible with modem communication via a POTS telephone line, in some cases as low as 2.4 kbits/s. The software also facilitates encapsulation of the digitized and compressed voice data into the TCP/IP protocol, with appropriate addressing to permit communication via the Internet. At the receiving end, the computer and software reverse the process to recover the analog voice information for presentation to the other party. Such programs permit telephone-like communication between Internet users registered with Internet Phone Servers.

The book "Mastering the Internet", Glee Cady and Pat McGregor, SYBEX Inc., Alameda, Calif., 1994, ISBN 94-69309, very briefly describes three proprietary programs said to provide real-time video and voice communications via the Internet.

Palmer et al. U.S. Pat. No. 5,375,068, issued Dec. 20, 1994 for Video Teleconferencing for Networked Workstations discloses a video teleconferencing system for networked workstations. A master process executing on a local processor formats and transmits digital packetized voice and video data, over a digital network using TCP/IP protocol, to remote terminals.

Lewen et al. U.S. Pat. No. 5,341,374, issued Aug. 23, 1994 for Communication Network Integrating Voice Data and Video with Distributed Call Processing for voice, data and video. Real-time voice packets are transmitted over the network, for example to and from a PBX or central office.

Hemmady et al, U.S. Pat. No. 4,958,341, issued Sep. 18, 1990 for Integrated Packetized Voice and Data Switching System, discloses an integrated packetized voice and data switching system for a metropolitan area network (MAN). Voice signals are converted into packets and transmitted on the network. Tung et al. U.S. Pat. No. 5,434,913, issued Jul. 18, 1995, and 5,490,247, issued Feb. 6, 1996, for Video Subsystem for Computer Based Conferencing System, disclose an audio subsystem for computer-based conferencing. The system involves local audio compression and transmission of information over an ISDN network.

Hemmady et al. U.S. Pat. No. 4,872,160, issued Oct. 3, 1989, for Integrated Packetized Voice and Data Switching System, discloses an integrated packetized voice and data switching system for metropolitan area networks.

Sampat et al, U.S. Pat. No. 5,493,568, issued Feb. 20, 1996, for Media Dependent Module Interface for Computer Based Conferencing System, discloses a media dependent module interface for computer based conferencing system. An interface connects the upperlevel data link manager with the communications driver.

Koltzbach et al. U.S. Pat. No. 5,410,754, issued Apr. 25, 1995, for Bi-Directional Wire Line to Local Area Network Interface and Method, discloses a bi-directional wire-line to local area network interface. The system incorporates means for packet switching and for using the Internet protocol (IP).

These systems, however, have not provided any substantial degree of mobility. The location and address of the destination must remain fixed to permit a sender to find and send packets to a destination. Also, in the prior art voice communication systems, both users had to have a PC to communicate via the Internet. A need therefore exists to expand the capabilities of these and other Internet telephone systems by making them effectively connectable to Cellular telephones and other types of wireless Personal Communication Systems (PCS) even when the destination wireless devices are roaming.

Concurrent with recent developments in public packet data communications such as the Internet, outlined above, the telephone industry has been developing an enhanced telephone network, sometimes referred to as an Advanced Intelligent Network (AIN), for providing a wide array of new voice grade telephone service features. In an AIN type system, local and/or toll offices of the public telephone network detect one of a number of call processing events identified as AIN "triggers". For ordinary telephone service calls, there would be no event to trigger AIN processing; and the local and toll office switches would function normally and process such calls without referring to the central database for instructions. An office which detects a trigger will suspend call processing, compile a call data message and forward that message via a common channel interoffice signaling (CCIS) link to a database system, such as an Integrated Service Control Point (ISCP) which includes a Multi-Services Application Platform (MSAP) database. If needed, the ISCP can instruct the central office to obtain and forward additional information. Once sufficient information about the call has reached the ISCP, the ISCP accesses its stored data tables in the MSAP database to translate the received message data into a call control message and returns the call control message to the office of the network via CCIS link. The network offices then use the call control message to complete the particular call. An AIN type network for providing an Area Wide Centrex service, for example, was disclosed and described in detail in commonly assigned U.S. Pat. No. 5,247,571 to Kay et al., the disclosure of which is entirely incorporated herein by reference.

In our increasingly mobile society, there has been an ever increasing demand for mobile communications to allow a person to roam freely while making and receiving telephone calls from virtually any location. A wide range of wireless systems are in use today and more are now scheduled for near term future deployment, including cellular telephone systems (both analog and digital) and lower power portable handset type systems now commonly referred to as personal communications service (PCS) systems.

The assignee of the present application has proposed and tested a PCS system integrating wireless and wireline communications using AIN routing technology, as disclosed in U.S. Pat. No. 5,353,331 to Emery et al. The disclosure of that Patent is incorporated herein entirely by reference. In that system, as the subscriber roams, the wireless handset periodically registers its location through a mobile switch or through a home land line base station. This information is recorded in the ISCP for use in routing subsequent calls to the handset at its current location.

To date, the AIN voice telephone network and related mobile telephone services have been separate technical areas of development, with no substantial interaction between those network technologies and the Internet. It is possible to use AIN routing to direct calls to different lines as a customer moves from station to station, but telephone networks require wireline interconnection. Mobile telephone systems provide excellent mobile voice communications over the area of coverage, but in many cases the areas of coverage of any given system may be limited. Roaming to other areas creates problems if the home mobile carrier does not have a roaming agreement with one of the carriers in the area that the subscriber roams into or if there is no carrier in the area which has compatible equipment. By contrast, the Internet provides nearly world wide access for data communications; but as noted above, the Internet does not yet provide an adequate roaming capability, particularly for voice communications.

From the above discussion of the prior art it becomes clear that a need still exists to provide a high degree of mobility for roaming voice communications using the wide area network coverage provided by public packet data networks such as the Internet.

DISCLOSURE OF THE INVENTION

An object of the invention is to provide a two-way audio (e.g., voice) communication service via a public packet data network, such as the Internet, which permits users to roam freely.

It is a further object of the instant invention to allow Internet telephone access to personal communication systems/cellular telephones via the Public Switched Telephone Network (PSTN).

Another object of the invention is to expand the telecommunication functions performable over the Internet.

Another object of the invention is to combine some functional capabilities of the Advanced Intelligent Network (AIN) with those of the Internet.

It is a further object to use the data found in Home Location Registers to reroute calls placed to Internet computers, over to cellular telephones or to wireline telephones.

It is an object to provide a system where a single Domain Name address used on an Internet telephone can be used to communicate with another Internet telephone or telephones on the PSTN, both wireline and wireless.

The invention relates to systems and methods for expanding the telephone services available over the interlinked system of packet data networks popularly known as the Internet. Public switched telephone networks utilizing intelligent network systems are arranged in an architecture combined with the Internet to provide a methodology for facilitating telephone use of the Internet to complete calls from personal computers to cellular telephones and from personal computers to personal communications devices on terminals, whether they be stationary or roaming. The system relies on an enhancement of the Domain Name Server of the Internet by supplying it with data from the Advanced Intelligent Network (AIN), particularly home location register data. Using this data the Internet is able to route calls to destinations, such as cellular telephones, PCS terminals, etc., in an intelligent fashion and to perform other diverse preprogrammed telecommunication services.

Thus, in one aspect, the invention provides a mobile telephone communication system. The inventive system includes a public packet data network, such as the Internet. A plurality of computers are coupled for data communication via the public packet data network. Some of the computers include elements providing voice telephone communication capabilities. A Domain Name Server system coupled to the public packet data network receives a domain name query from a calling one of the telephone capable computers. In response, the Domain Name Server system sends an address back to the calling computer. A public switched wireline telephone network, such as the PSTN, includes a plurality of central office switching systems, an interoffice signaling network and at least one service control point database coupled to the interoffice signaling network. A data communication module couples the Domain Name Server system to the interoffice signaling network of the public switched wireline telephone network. The communication system also includes a wireless communication network, typically having one or more mobile switching offices coupled to one or more of the central office switching systems.

The communication system also may include at least one gateway server. The gateway server couples the packet data network to one of the central office switching systems. The gateway server processes telephone communication signals for transport over the public packet data network.

The mobile communication in accord with the invention utilizes an enhanced Domain Name Server system, for controlling routing of calls through a public packet data network. This enhanced system includes a Domain Name Server coupled to the public packet data network. The Domain Name Server receives queries relating to calls for subscribers to a 'follow-me' type service, i.e., to subscribers who may be roaming. The Domain Name Server receives the queries from calling computers and sends addresses in responses back to the calling computers. The Domain Name Server includes a domain name to address translation table. The Domain Name Server runs software to execute a conditional analysis in response to a domain name query before transmitting an address back in a response. The enhanced system also includes a data communication module. This module couples the Domain Name Server to an interoffice signaling network of an intelligent public switched telephone network. This communication link enables the Domain Name Server to obtain information from a node of the intelligent public switched telephone network, for example to control conditional analysis in response to domain name queries and/or to specify destination addresses different from those produced by the domain name to address translation table.

In another aspect, the invention relates to methods of routing calls, particularly telephone calls, through a public packet data network such as the Internet.

For example, one inventive method includes the steps of receiving a domain name query at a server coupled to the public packet data network and executing a conditional analysis in response to the domain name query. If the conditional analysis produces a first result, a domain name included in the query is translated into a first destination address. If the conditional analysis produces a first result, query is translated into a first destination If the conditional analysis produces a second result, the server obtains control information from a routing control database of the public switched telephone network (e.g. an ISCP). In response to the information, the server generates a second destination address based on the control information. A response message containing the first or the second destination address is transmitted to a calling terminal for use in establishing communication at least partially through the public packet data network.

In the disclosed preferred embodiments, the first destination address typically relates to a called party's computer or terminal. The second destination address may relate to call routing via the public switched telephone network, for example to route the call through a gateway device and the telephone network to a telephone set at the called party's current location. Alternatively, the second destination address may relate to call routing via a mobile telephone system providing wireless communications to the called party's current location.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BEST MODE FOR CARRYING OUT THE INVENTION

Figure 1:
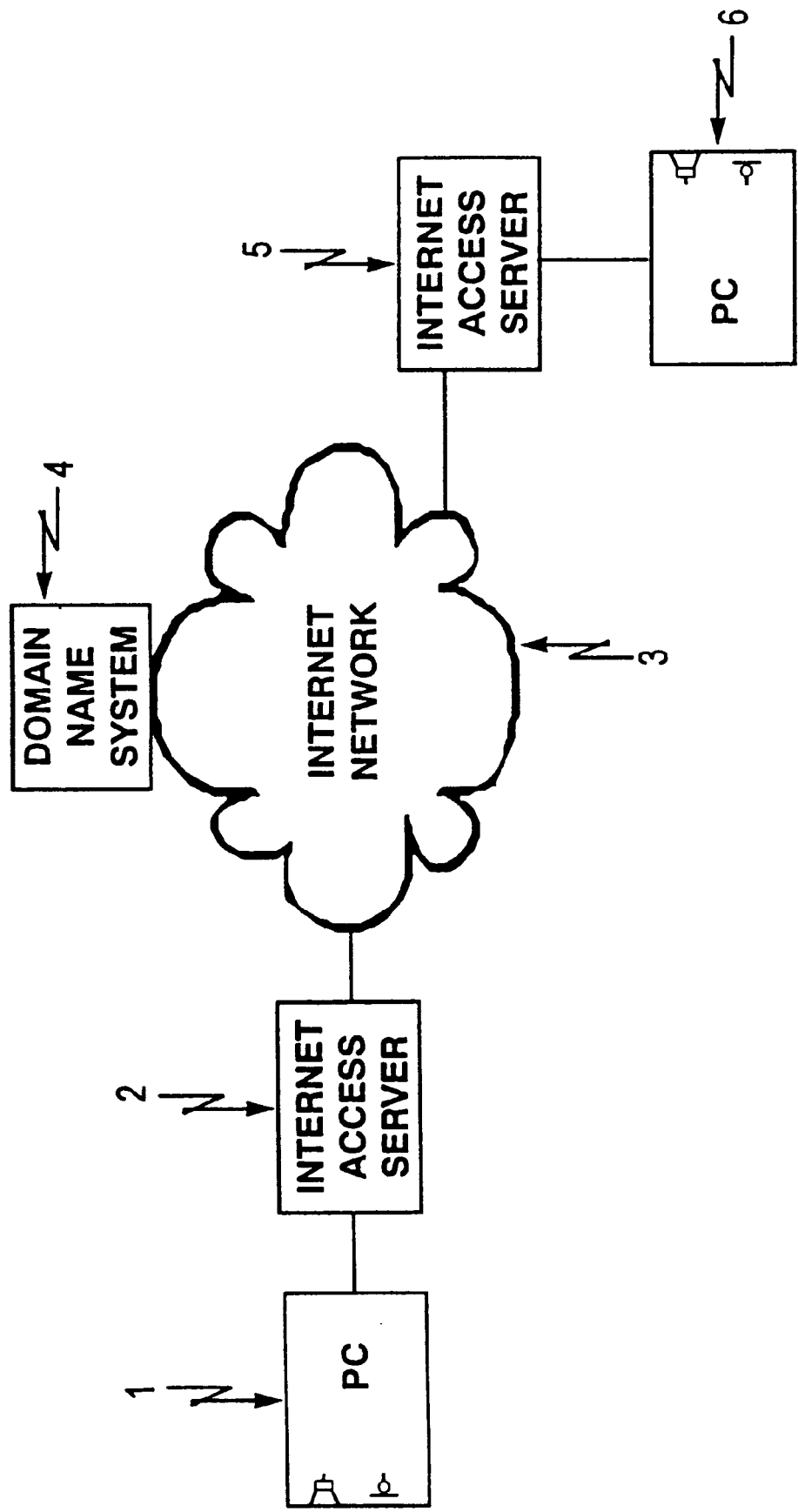
FIG. 1 is a simplified diagram of an Internet system with telephone capabilities.

The present invention provides PCS type roaming subscriber, voice communications through a packet data network. The packet data network typically is a public packet data network, such as the network now commonly referred to as the 'Internet'. Further discussions of the invention below will reference the preferred packet data network, i.e. the Internet. FIG. 1 is a simplified diagram of an Internet system set up to enable telephone calls from one computer to another.

Item 1 shown on FIG. 1 is a personal computer (PC) equipped to make telephone calls. For this purpose, the PC 1 includes a microphone and speaker and an interface thereto for two-way conversion of audio between digital and analog. The CPU of the PC runs compression and decompression software. The PC 1 also includes a digital communications interface, such as a modem, an ISDN card or a local area network (LAN) interface card. Item 2 shown in FIG. 1 is an Internet access server. The Internet access server 2 provides a compatible interface to the PC 1 (modem, ISDN or LAN) and protocol conversion and interfacing, as necessary, for two-way data communication over the packet data Internet. For example, the server 2 may comprise a modem bank coupled through a high speed link to an Internet router.

Figure 5:
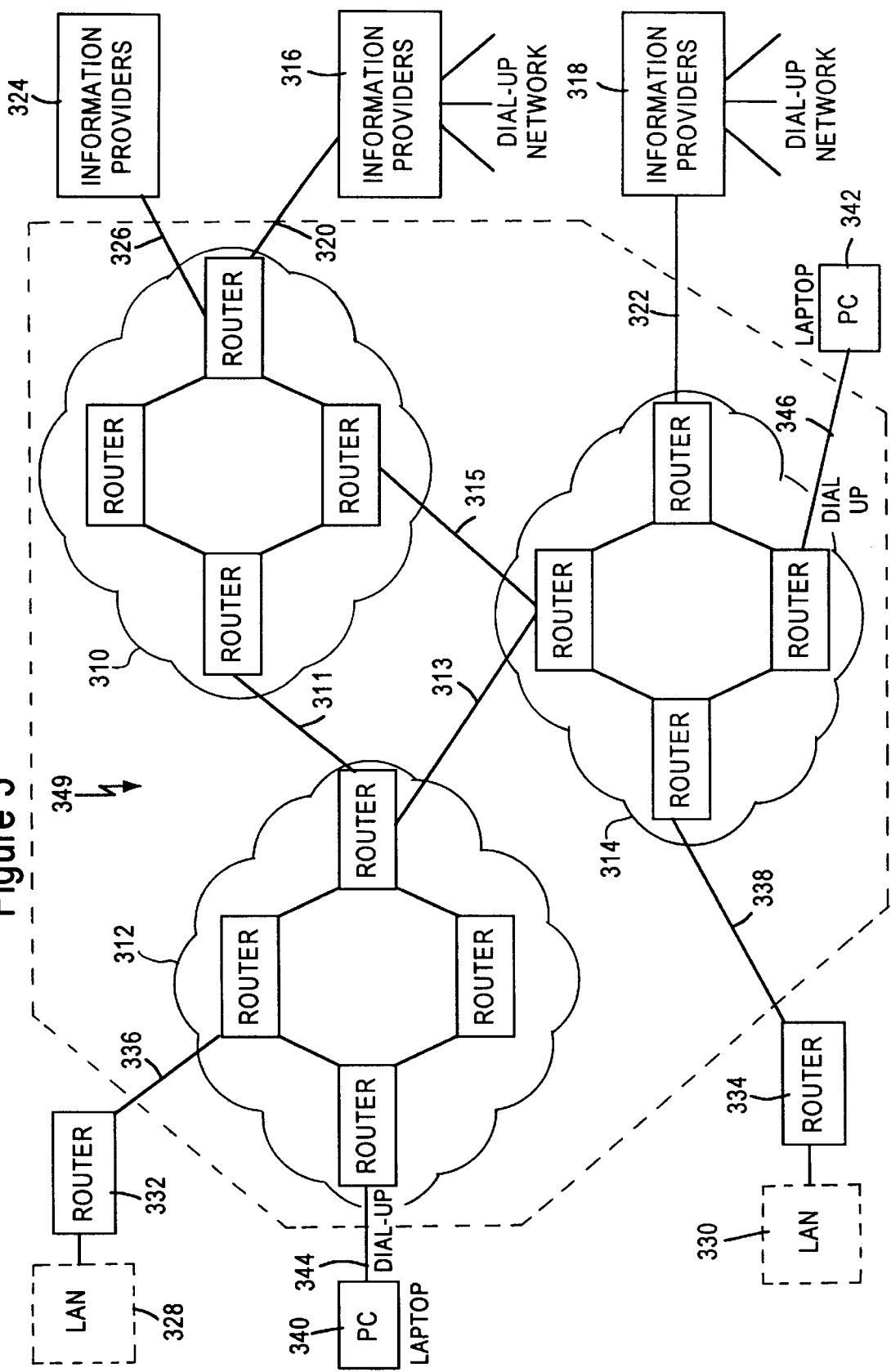
FIG. 5 is a block diagram of the Internet.

The Internet itself, illustrated by the cloud 3, comprises a network of interconnected routers and networks as shown in FIG. 5 and discussed above. One element coupled to the Internet is a Domain Name Server 4. The Domain Name Server is a computer or system of computers coupled to the Internet and having an address for two-way data communications. The Domain Name Server runs software and stores tables to translate textual domain names into numeric IP addresses, in responses to requests from communication devices of various types which use the Internet.

Item 5 is another Internet access server similar to server 2, and Item 6 is another personal computer (PC) similar to PC 1. A typical operation of the system of FIG. 1 is as follows:

An operator sitting at her computer 1 decides to communicate with someone at another computer 6. She enters that person's domain name address, which is a textual address such as EVOIT @ NOW.DT.COM. Her computer transmits a query containing this textual address through the Internet 3 to the Domain Name Server 4. The Domain Name Server 4 converts the textual address to an IP address, such as 183.63.47.57. That IP address is fed back to the caller's computer 1 and that computer uses the IP address to route the call information to its proper destination—the called computer 6.

If the called person is at his computer he can answer the call. If not a message can perhaps be placed on voice mail, if the called computer has storage and software for a voice mail capability.

In those instances where the called person is not located at her computer installation (a great deal of the time for most people) it is desirable to be able to complete the call to that person without any significant further action by the caller, even if that person is roaming. The present invention provides a conditional analysis in response to the domain name query. In particular, this analysis enables the Domain Name Server to obtain current location information and provide a current address for use by the calling party's computer. Viewed another way, calls for the called party can be directed to that party's current location, for example, if the conditional analysis indicates that the called party is not available at their 'home' or normal address location. The block diagram of FIG. 2 is a simplified illustration of a system providing this desirable service.

Figure 2:
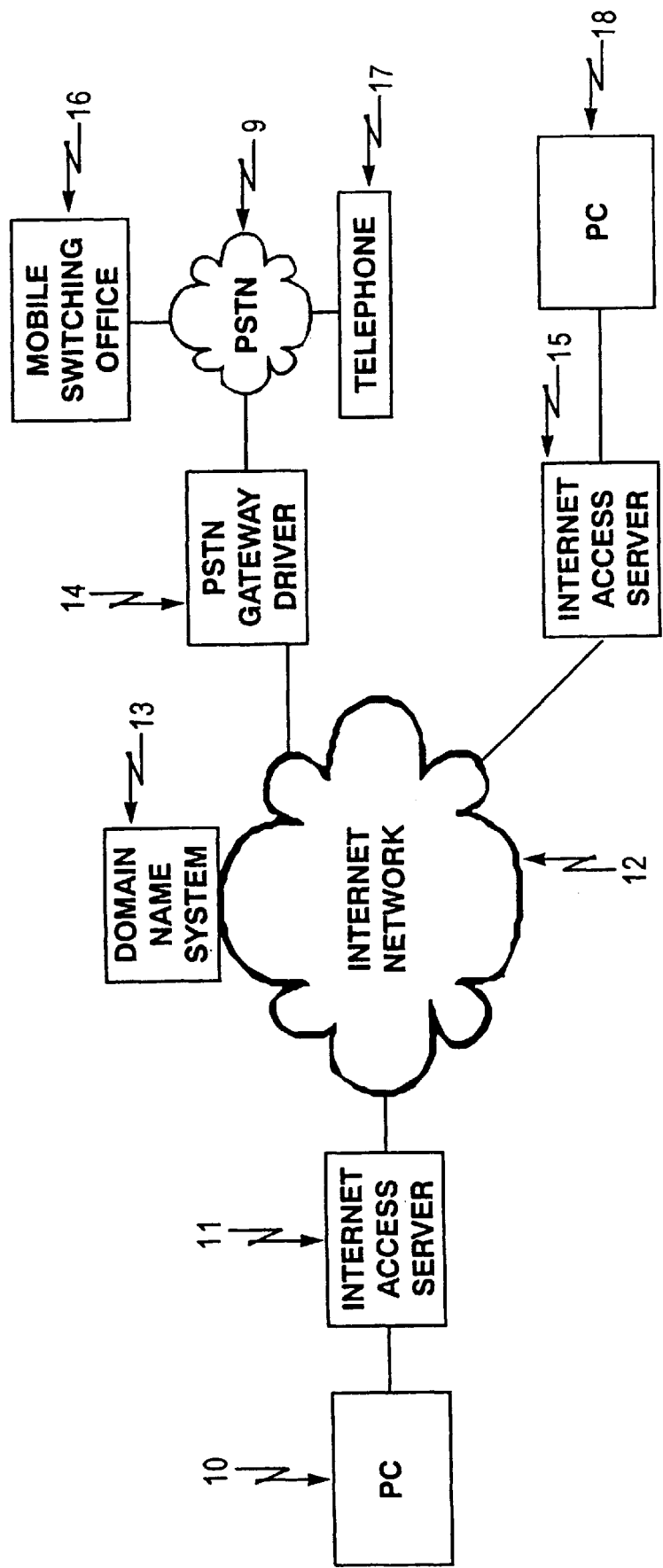
FIG. 2 shows a simplified diagram of the Internet with a modified Domain Name server.

Referring to FIG. 2, item 10 is a personal computer, and item 11 is an Internet access server. The cloud 12, signifies the Internet, and item 13 is a modified Domain Name Server. Item 14 is a Gateway server for voice telephone communications via the Public Switched Telephone Network (PSTN) and item 16 is a Mobile Switching Office (MSO) for cellular and/or PCS type communications. Item 15 is another Internet access server, item 17 is an example of a telephone, and item 18 is another personal computer. The telephone 17 and the MSO 16 connect to the public switched telephone network (PSTN) 9 for landline communications. The PCs and access servers are generally similar to those in FIG. 1. The telephone and MSO are standard components used for voice telephone services today.

The PSTN gateway server 14 connects to the actual PSTN network 9. The server 14 provides a voice telephone grade interface to the Internet 12, for a large number of calls, between telephone networks such as the PSTN and/or cellular or PCS type mobile telephone networks. Typically, such a gateway server will connect to a central office of the PSTN 9 via one or more primary rate interface type ISDN line groups or a combination of one or more T1 circuits and a Simplified Message Desk Interface type signaling circuit. The line circuits provide digital line interconnections of the server 14 to the PSTN 9. The PSTN gateway server 14 includes one or more computers for processing individual calls. The computer(s) include appropriate line interfaces for answering incoming calls and initiating outgoing calls over the particular type of line circuits. The interfaces also receive and decode standard signaling messages from the PSTN, e.g. DTMF dialing signals. Each of the computer(s) in the server 14 run software to compress incoming audio signals from the PSTN in a standardized format and decompress digital audio signals in that format received via the Internet 12, for transmission over the PSTN 9. The computer(s) also perform the two-way protocol processing to send and receive compressed, digitized voice data in TCP/IP packet form over the Internet 12. The PSTN gateway server 14 includes or connects to a router coupled to the Internet 12. Copending commonly assigned application Ser. No. 08/634,543 filed Apr. 18, 1996 describes several implementations of 'Internet Modules' which may serve as alternate embodiments of the PSTN gateway server 14.

The FIG. 2 system operates as follows. A caller at PC 10 enters a Domain Name Address or a telephone number. The PC 10 transmits a translation request message, containing the Domain Name Address or telephone number, to the modified Domain Name Server 13. The Domain Name Server 13 produces the IP address at some time T1, but does not immediately send it back to the calling equipment. Instead, response to the calling equipment is delayed until some time T2 and the interim time period is used to perform other functions, as discussed more below.

It should be understood that the preferred embodiment of the modified Domain Name Server is a programmed computer. The computer communicates via the Internet in the normal manner. In accord with an aspect of the invention, the computer also performs certain intelligent call processing, alone or in combination with control elements of the Advanced Intelligent Network. The diagram of FIG. 3 is presented to illustrate in simple terms one way in which the elements of the Domain Name Server computer may be effectively configured during the course of the computer's operation to perform some of the processes of the invention.

Figure 3:
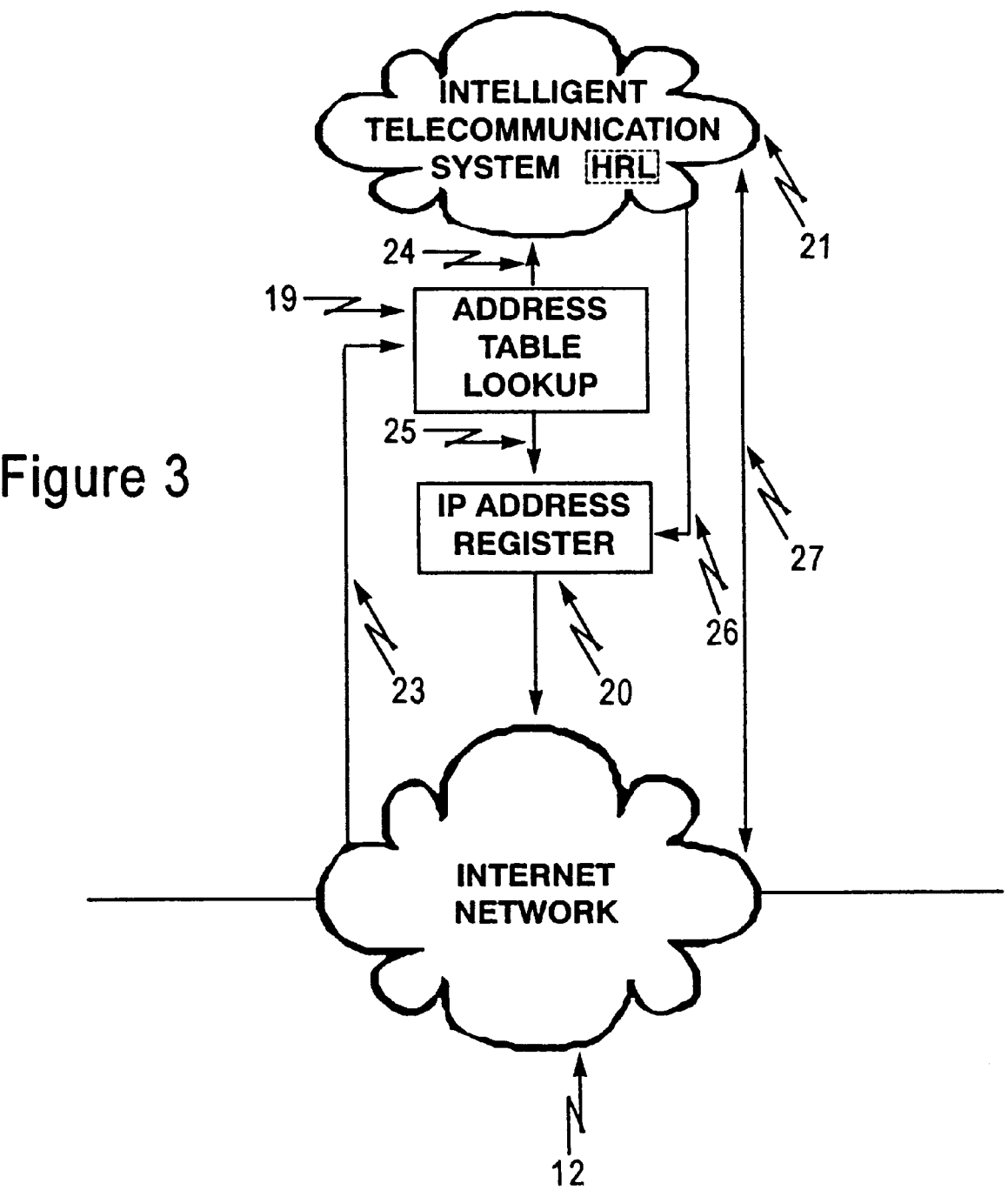
FIG. 3 is a diagram for explaining the modified Domain Name System in conjunction with FIG. 2.

FIG. 3 shows the Internet as cloud item 12. The caller will send a Domain name address in textual format (or possibly a telephone number) which is routed via logical connection 23 to an address table lookup process 19. The IP address emerges on logical connection 25 almost instantaneously and goes to IP address register 20 for temporary storage. Address table lookup 19 also communicates with the hardware/software performing intelligent telecommunications functions depicted as the cloud 21. The IP address will stay in the register 20 until the register 20 receives a signal from the intelligent system 21. After the intelligent system 21 finishes its conditional analysis deliberations, the system 21 signals IP address register 20 via logical connection line 26 to either send the IP address back to the calling equipment, load and send a different IP address or possibly to reset the register. The caller communicates with the called party or a designated alternate system or party using the IP address sent back by the Domain Name Server.

At least a portion of the intelligent communication system 21 is implemented as software running on the computer or hierarchical system of computers serving as the actual Domain Name Server. In the preferred embodiment discussed below, the intelligent system 21 also includes control elements of the wireline AIN network interfaced to and communicating with the physical computer(s) acting as the Domain Name Server.

It should be noted that any number of useful telecommunications functions can be performed by the system 2 by controlling the IP address returned as a result of the conditional analysis performed by the Domain Name Server and/or the control elements of the AIN. The IP address returned to the caller is determined by customized routing programs stored in a database in the intelligent communication system 21. These routing programs can provide a wide range of customized routing services, in a manner similar to the services provided by call processing records (CPRs) used in the AIN telephone network.

A caller, for instance, could be connected to the closest equivalent address. As an example consider that a caller is trying to reach one of a chain of drug stores. The caller enters the address of one drug store that happens to be across town from her. The system could be programmed to detect that there existed another store of that chain of drug stores which was physically closer to the caller and would automatically send back the IP address of that closest store rather than the IP address of the one across town. This would provide the caller with the convenience of dealing with a closer store. The system could also be programmed to block access to a particular IP address unless the caller can provide a special access code. If desirable, the customized routing program could activate a special form of billing for services. In fact, any sort of conditional access data file could be set up that would control the response to the caller and/or related call processing.

Of particular note, the conditional processing of domain name translations using routing programs or records from the intelligent network provides a 'follow-me' type routing functionality for directing calls to the current location of roaming subscribers. The system is configured or programmed to query or 'ping' the computer at the called IP address to determine if it is 'live.' Specifically, the Domain Name Server sends a query to the destination address identified in the address table lookup. If the destination PC is on or 'live', the PC so notifies the server in response to the query. If it is live, then the Domain Name Server transmits the IP address of that computer back to the calling equipment, and the calling PC completes the call through the Internet using that IP address. If the computer is not live, the system can 'look' for the called person at both wireline and mobile telephone stations. An implementation of such a service follows.

Referring again to FIGS. 2 and 3, intelligent processing system 21 would ping PC 18 to see if it were live. If the PC is off, a timer routine times out when there is no response to the query. Alternatively, the PC may be on but respond with a negative answer indicating that the called party is absent. If the PC is not live or returns a negative response, a check is made to determine if the called person has another telephone, either wireline or cellular. If she has a wireline telephone, then the call can be routed through the appropriate PSTN Gateway Server and ring the telephone, in this case telephone 17, by returning the appropriate IP address and telephone number to the calling PC.

If the called party is not at either her PC or a wireline telephone, a check can be made to see if she has a cellular phone or other type of wireless personal communications service (PCS) terminal. Typically, such a terminal is an analog or digital wireless telephone of some common type. If she does have such a terminal, a check can be made of her Home Location Register (HLR) to see where she is currently located.

The wireless terminal (PCS or cellular) periodically registers through MSOs, as the subscriber roams. The MSOs notify a database maintaining the HLR for the subscriber (see e.g., above-cited Emery et al. Patent). The data in the HLR will at least identify the MSO through which the terminal last registered, i.e., the MSO that presumably provides service in the area where the called party currently is located.

Based on the location information from the HLR, the call can be routed to the PSTN Gateway server nearest the Mobile Switching Office which is closest to the actual physical location of the called party, again by returning an IP address and a telephone number to the calling PC. The identified Mobile Switching Office would then complete the call to the called party's wireless terminal.

Figure 4:
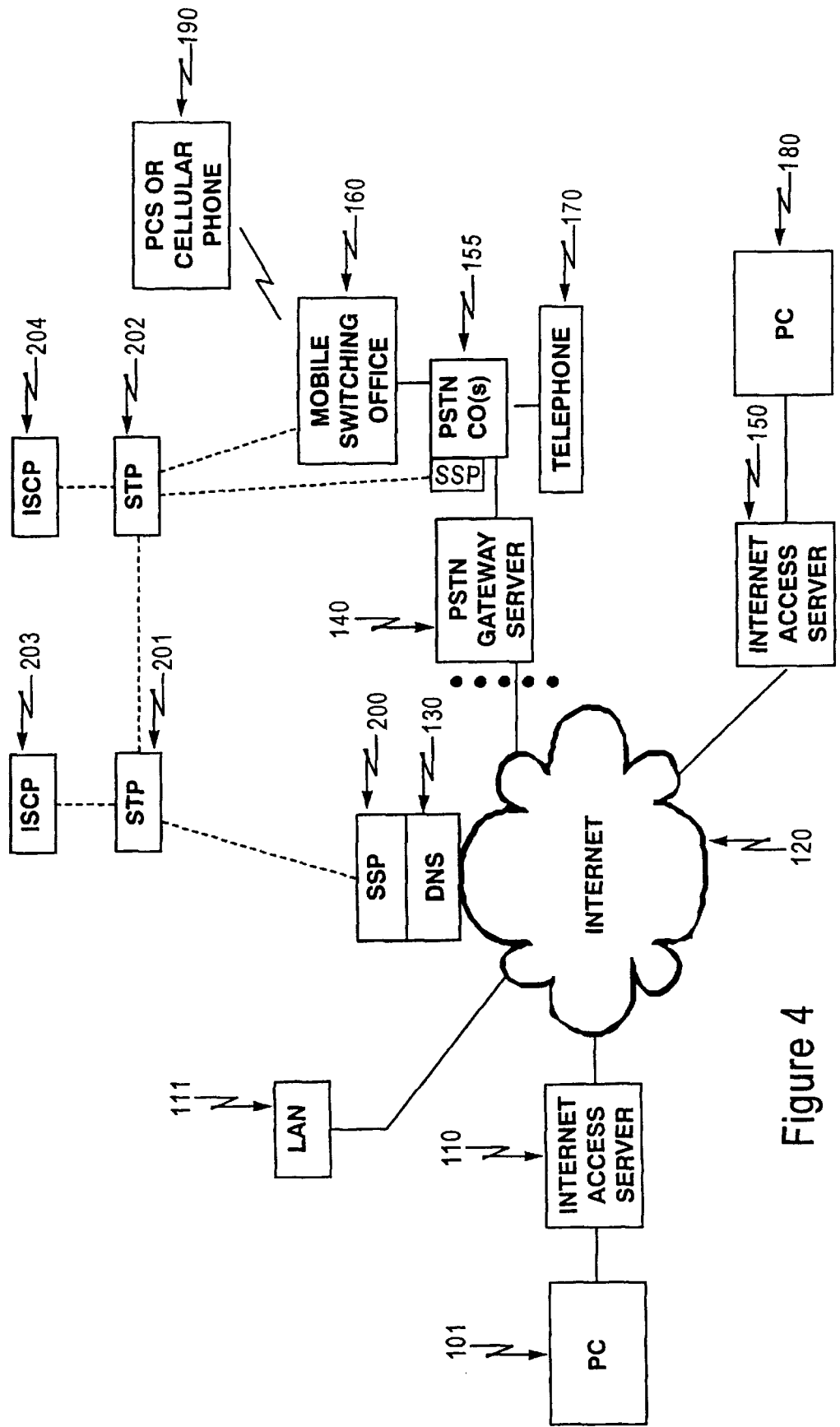
FIG. 4 is a block diagram of an Internet integrated with AIN by signaling links.

FIG. 4 is a more detailed diagram of a system providing the 'follow-me' type routing service in accord with the invention. In FIG. 4, item 101 is a personal computer (PC), item 110 is an Internet access server, cloud 120 represents the Internet, item 150 is another Internet access server and item 180 is another personal computer (PC), similar to those elements discussed above relative to FIGS. 1 and 2. Item 130 is an Integrated Domain Name Server.

Item 140 is an exemplary PSTN gateway server and item 160 is a Mobile Switching Office (MSO), similar to those discussed above relative to FIG. 2. The Mobile Switching Office provides mobile, wireless communications to a number of cellular telephones and/or PCS type handset telephone terminals. Item 190 is an exemplary phone serviced through the Mobile Switching Office 160. The PSTN server 140 connects to one or more central office switching systems or 'COs' 155 of the PSTN. The COs 155 also provide connections to one or more Mobile Switching Offices such as office 160.

The COs 155 have SSP (service switching point) data communication modules for SS7 signaling, both for inter-office signaling and for signaling databases such as those in ISCPs 203, 204. The Mobile Switching Office 160 also connects to the signaling network (although a separate SSP for MSO 160 is not shown, to simplify the drawing). SSP capable offices 155, 160 use SS7 signaling in accord with the ISDN user part protocol (ISUP) for call set and use SS7 signaling in accord with the transaction capabilities applications protocol (TCAP) for query and response communications with a database.

Item 200 represents a service switching point (SSP) providing SS7 signaling data communication capabilities for the Domain Name Server (DNS) 130. Items 201 and 202 represent signaling transfer points (STPs), and items 203 and 204 represent Intelligent Service Control Points (ISCPs). The broken lines interconnecting items 200 to 204 are SS7 links. Items 200 to 204 are part of the signaling portion of the Advanced Intelligent Network (AIN).

Each of the ISCPs 203, 204 is an integrated system. Among other system components, an ISCP includes a Service Management System (SMS), a Data and Reporting System (DRS) and the actual database referred to as a Service Control Point (SCP). The ISCP also typically includes a terminal subsystem referred to as a Service Creation Environment or SCE for programming the MSAP database in the SCP. The database in the SCP is a routing control database comprising call processing records for the services subscribed to by each of the individual customers. The components of the ISCP are connected by an internal, high-speed data network, such as a token ring network. The internal data network also typically connects to a number of interfaces for communication with external data systems, e.g. for provisioning and maintenance.

The SSP 204 is an SS7 compatible data communication module, similar to those associated with the COs 155, providing the Domain Name Server 130 with an SS7 link to the STP 201. This enables the Domain Name Server 130 to communicate over the SS7 signaling network portion of the AIN, for example with one or more of the ISCPs 203, 204. AIN is a system which provides centralized control of telephone services provided to subscribers through diversely located central office switching systems. See again the above discussed U.S. Pat. No. 5,506,887 for descriptions of how AIN is used to integrate and control wireless telecommunications systems such as cellular telephones with land line wired systems. The provision of an SSP 200 for the Domain Name Server 130 serves to integrate the intelligent control provided by the Domain Name Server in accord with the invention together with the signaling and intelligent control functionalities of the AIN type public switched telephone network.

A typical call using a system such as shown in FIG. 4 proceeds as follows. A caller at PC 101 enters the textual domain name address (or telephone number) of the potential call recipient's personal computer, in this example the computer item 180. The textual domain name address goes to the integrated Domain Name Server 130. That Server looks up the IP address of the PC, in this case PC 108. The Server 130 then pings PC 108 to see if the PC is live. If PC 108 is live then the Server 130 returns the IP address to the caller, the calling data is formatted with the IP address protocol and the data is routed to PC 108 completing the call, essentially as discussed above.

However, if the PC 108 is not live or is not taking calls for any reason, the Domain Name Server system 13 will then query the Home Location Register of the person called (assuming that person has a mobile communications device). The ISCP in the subscriber's home region is usually the source of that subscriber's Home Location Register (HLR) data. The HLR stores routing data for routing calls to the called party's current location. That party periodically registers with the HLR to keep the location information current (see e.g. U.S. Pat. No. 5,506,887). The Home Location Register (HLR) responds back to the Domain Name Server 130 with the current status (location) of the called party (whether roaming or not). If the called party is roaming, the response includes a temporary local directory number (TLDN) for routing through the Mobile Switching Office 160 which is serving the called party. If the called party is roaming, the Domain Name Server will send the calling PC the TLDN and the IP address of whichever PSTN Gateway Server 140 will most efficiently allow connection to the Mobile Switching Office 160 which is currently serving the called party. If the called party is not roaming, the Domain Name Server will reply to the calling PC with the IP address of the best PSTN Gateway server, i.e. the server closest to the called party's wireline telephone 170, as well as the directory number assigned to that telephone. The ISCP also can perform billing services for the calls.

Figure 6:
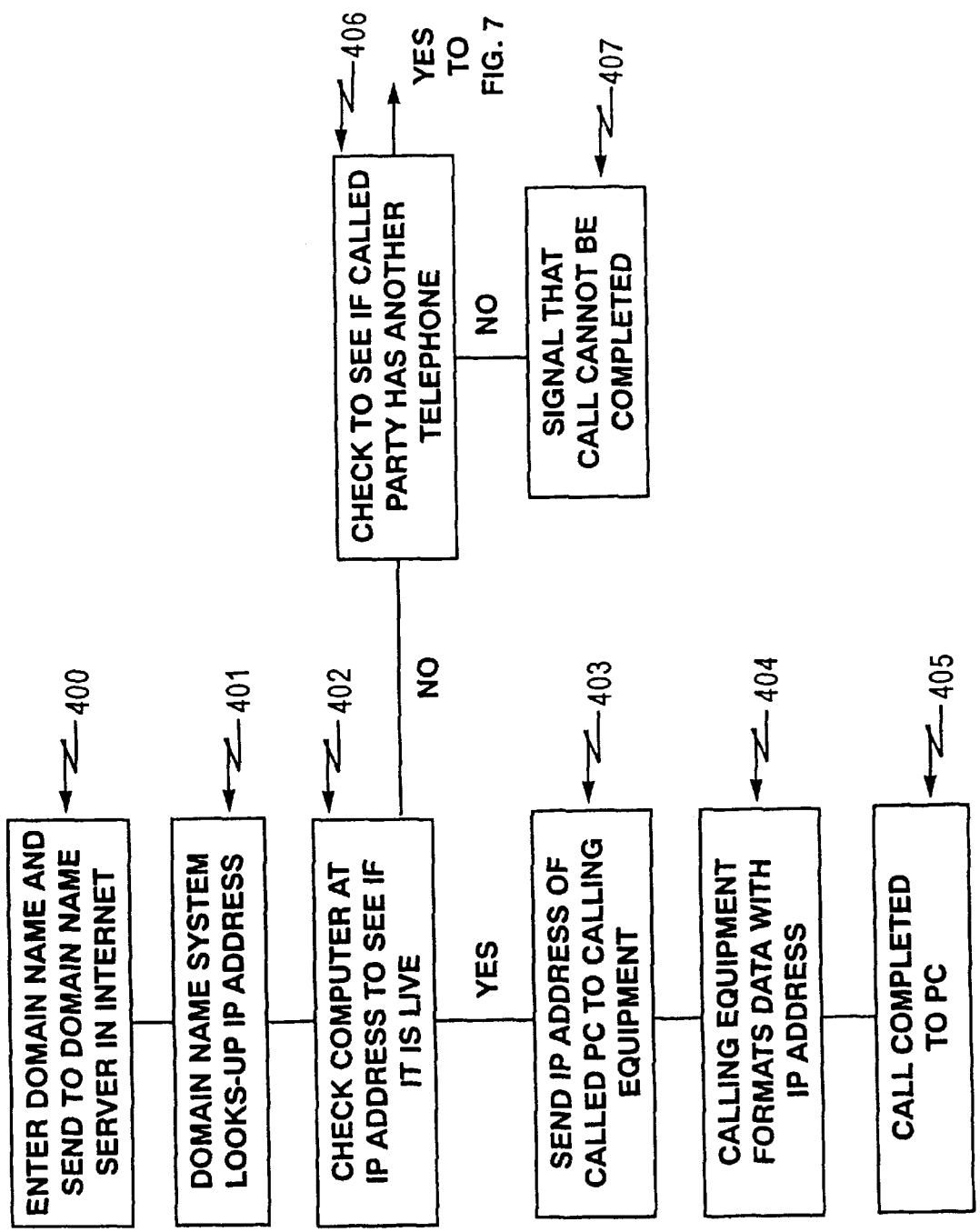
FIGS. 6 and 7 together form a flow diagram of the processes of the invention.
Figure 7:
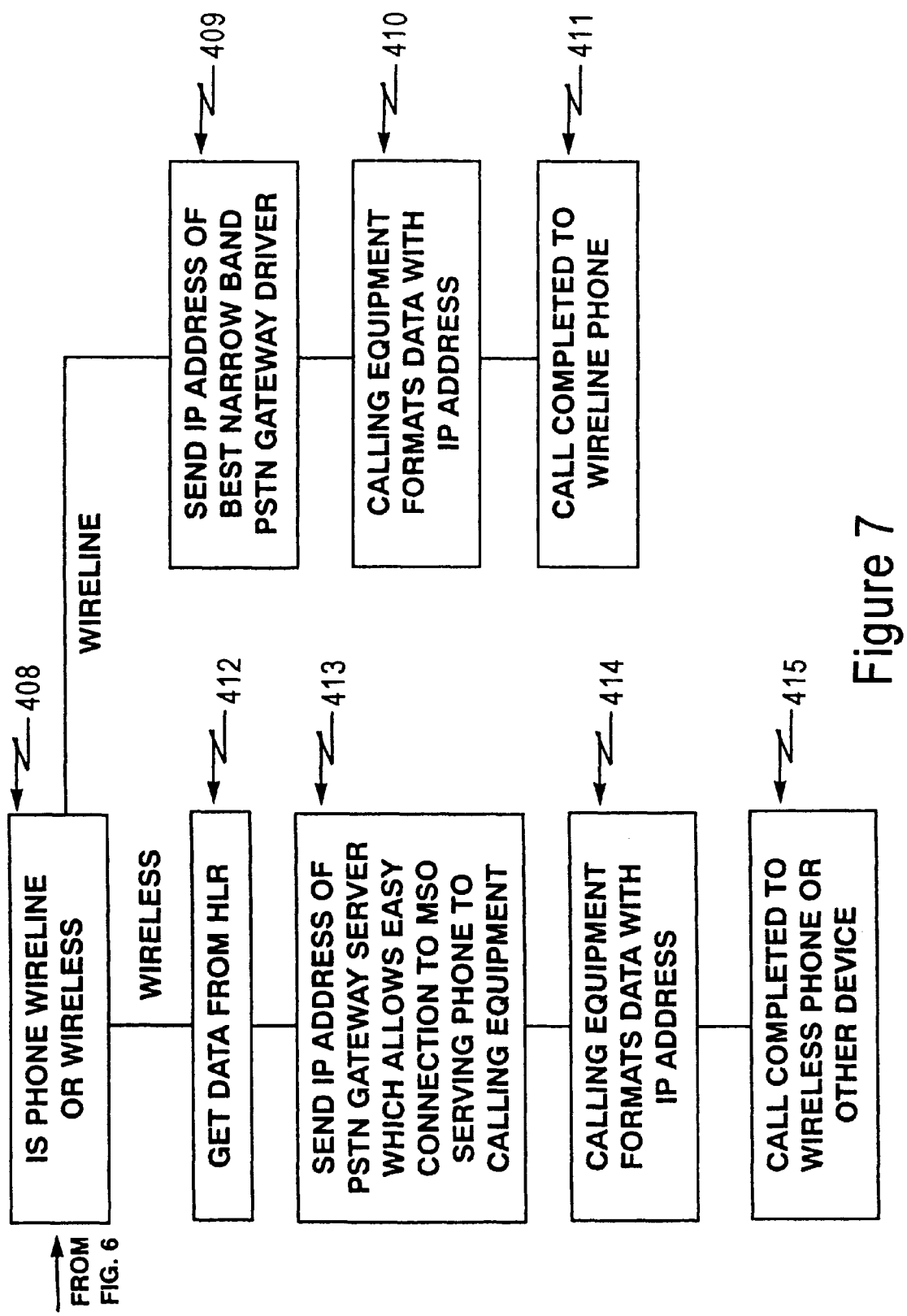

FIGS. 6 and 7 illustrate processes of the invention. Initially at step 400 (FIG. 6), the caller will enter the textual domain name address of the PC (party) she is calling, and that textual address will be routed to the Domain Name Server system via the Internet. The Domain Name Server system looks up the IP address (step 401) and then activates a message to 'ping' the called party's PC to see if it is live (step 402). If the called PC is live, then the Domain Name Server sends the numerical IP address for that PC back to the calling PC (step 403). The calling PC then formats the call related signaling and voice data with the IP address of the called PC (step 404), and the call is completed in the normal fashion, i.e. by the IP routing of addressed data packets via the Internet to and from the called PC (step 405).

If at step 402 the 'ping' processing results in a determination that the called party's computer is not live, another process begins. A check is made with a database, either in the Domain Name Server or in the ISCP (reachable by SS7 signaling links) to see if the called party has another telephone (step 406). If the called party has no other telephone, then a signal could be returned to the calling PC indicating that the call cannot be completed (step 407). If the called party has another telephone, a check can be made by accessing a database in the Domain Name Server or in the AIN, to see if the alternate telephone is a wireless or wireline telephone (step 408 in FIG. 7). Possibly the party has both. If the party has a wireline telephone, the system locates the IP address of the best narrowband PSTN Gateway Server, usually the server closest to the called party's wireline telephone (step 409). That address, and possibly the number of the telephone, are sent back to the calling equipment (step 410). The calling PC formats the data packets with the address. The call is then completed through that Gateway Server over the PSTN to the wireline telephone (step 411).

If at step 408 it is determined that the called party has a wireless telephone, then the system will seek to find the current location of that telephone. As noted above, the system maintains current location data in the called party's Home Location Register (HLR) in the ISCP. The Domain Name Server queries the ISCP for the location data and any related routing data needed to complete the call, using the SS7 signaling links (step 412). Home Location Registers currently exist in the Advanced Intelligent Network (AIN) and are typically located in an ISCP. Home Location Registers could be maintained within the Internet itself either in a central location or distributed throughout the system as long as they are accessible by the Domain Name Server system. The system then determines the address of that PSTN Gateway Server which will allow easy connection to the Mobile Switching Office currently serving the roaming telephone (step 413). The system also obtains a temporary local directory number (TLDN) for routing the call through the Mobile Switching Office. The PSTN Gateway Server address and TLDN are sent back to the calling equipment. The calling PC formats the voice call signaling data including the TLDN with the address (step 4142, and the calling data is then routed to the PSTN Gateway Server. The PSTN Gateway Server uses the TLDN to complete the call through the MSO to the roaming wireless telephone (cellular or PCS).

The present invention admits of a number of modifications that will be apparent to those skilled in the art. For example, the disclosed embodiments utilized a Domain Name Server system implemented in a single computer. In a large scale deployment, the Domain Name Server system would comprise a number of computers in a hierarchical arrangement. Each such computer communicates both through the Internet and through the common channel interoffice signaling (CCIS) system of the intelligent PSTN. Also, a wide variety of schemes can be used to maintain location registration information in the HLR.

Also, for convenience, the above detailed discussion has emphasized calls from a telephone capable PC. The inventive call processing methodology applies equally well to calls from ordinary telephones (wireline or wireless) that reach the packet data network (Internet) via a PSTN Gateway Server. The Gateway Server acts as a telephone capable computer. The Gateway Server queries the Domain Name Server system for translation (typically for translation of a telephone number), and the call is processed thereafter in essentially the same manner as for the call from a telephone capable PC discussed in detail above.

It will be readily seen by one of ordinary skill in the art that the present invention fulfills all of the objects set forth above. After reading the foregoing specification, one of ordinary skill will be able to effect various changes, substitutions of equivalents and various other aspects of the invention as broadly disclosed herein. It is therefore intended that the protection granted hereon be limited only by the definition contained in the appended claims and equivalents thereof.

We claim:

1. A telecommunications system for providing telephone access from the Internet to cellular telephones comprising:
   a Domain Name Server system associated with the Internet, said Domain Name Server system receiving textual domain name addresses from Internet telephone equipment attempting to make a call and being capable of responding back to the calling Internet telephone equipment with an Internet Protocol (IP) address corresponding to the received textual domain name addresses;
   means associated with the Domain Name Server system for delaying sending the IP address back to the calling Internet telephone equipment; and
   means associated with the Domain Name Server system to perform a preprogrammed telecommunication routing control function beginning substantially upon lookup of the said IP address and ending just prior to a response to the calling Internet telephone equipment, wherein the preprogrammed telecommunication routing control function comprises querying a computer corresponding to the IP address via the Internet to determine if that computer is ready to receive an incoming call.

2. A telecommunication system as in claim 1, wherein the preprogrammed telecommunication routing control function further comprises obtaining called party location data from a home location register in the system if the computer is not ready to receive an incoming call.

3. A telecommunication system as in claim 2, wherein the preprogrammed telecommunication routing control function further comprises sending an IP address of a PSTN Gateway Server serving the called party location to the calling Internet telephone equipment.

4. A telecommunication system, for providing telephone access from the Internet to cellular telephones comprising:
   a Domain Name Server system associated with the Internet, said Domain Name Server system receiving textual domain name addresses from Internet telephone equipment attempting to make a call and being capable of responding back to the calling Internet telephone equipment with an Internet Protocol (IP) address corresponding to the received textual domain name addresses;
   means associated with the Domain Name Server system for delaying sending the IP address back to the calling Internet telephone equipment; and
   means associated with the Domain Name Server system to perform a preprogrammed telecommunication routing control function beginning substantially upon lookup of the said IP address and ending just prior to a response to the calling Internet telephone equipment, wherein the preprogrammed telecommunication routing control function includes generation of billing data.

5. A telecommunication system, for providing telephone access from the Internet to cellular telephones comprising:
   a Domain Name Server system associated with the Internet, said Domain Name Server system receiving textual domain name addresses from Internet telephone equipment attempting to make a call and being capable of responding back to the calling Internet telephone equipment with an Internet Protocol (IP) address corresponding to the received textual domain name addresses wherein the Domain Name Server system comprises a computer coupled for two-way data communication via the Internet;

means associated with the Domain Name Server system for delaying sending the IP address back to the calling Internet telephone equipment; and means associated with the Domain Name Server system to perform a preprogrammed telecommunication routing control function beginning substantially upon lookup of the said IP address and ending just prior to a response to the calling Internet telephone equipment.

6. A telecommunication system as in claim 5, wherein the Domain Name Server system further comprises:

a routing control database of an intelligent landline telephone network; and a data module providing two-way signaling data communication between the computer and the routing control database.

7. A telecommunication system as in claim 6, wherein:

the routing control database is an element of an integrated services control point coupled to an interoffice signaling network of the landline telephone network; and the data module provides a two-way data communication interface for the computer via the interoffice signaling network.

8. A telecommunications system comprising:

a public packet switched data network;

at least two access servers operationally connected to the said public packet switched data network;

at least two personal computers equipped for Internet telephone service and operationally, connected to said access servers;

a PSTN Gateway Server operationally connected to the public packet switched data network for voice telephone communications;

a Mobile Switching Office operationally connectable to said PSTN Gateway Server;

at least one wireless personal communications terminal for communication via said Mobile Switching Office;

a Domain Name Server operationally connected to the public packet switched data network;

a Service Control Point (SCP) database system; and a Signaling Transfer Point (STP) coupled to the SCP, the Mobile Switching Office and the said Domain Name Server.

9. A telecommunications system as in claim 8, wherein the SCP directs information about current location of the personal communications terminal to the Domain Name Server.

10. A telecommunication system as in claim 8, wherein the SCP generates data for billing purposes.

11. A method comprising:

modifying an Internet Domain Name System to delay for a time period a response to a domain name translation query relating to subscriber to a follow-me type routing service from a querying Internet terminal device; and executing during said time period, a process to determine whether to include a home Internet Protocol (IP) address or to include an alternate IP address in a response message; and sending the response message to the Internet terminal device.

12. A method as in claim 11, wherein the home address corresponds to a telephone capable computer.

13. A method as in claim 12, wherein the alternate address facilitates communication to a telephone.

14. A method as in claim 13, wherein the telephone is a landline telephone.

15. A method as in claim 13, wherein the telephone is a wireless telephone.

16. A method for providing telephone services over the Internet comprising:

providing SS7 signaling links from a Domain Name Server coupled to the Internet to an intelligent telephone network;

delaying for a time period a response to an Internet telephone, which telephone is querying the Internet Domain Name Server for translation of a domain name of a subscriber to a roaming communication service;

during the said time period, obtaining data over the SS7 links from the intelligent telephone network for executing a call; and transmitting the response including information dependent on the data.

17. A method as in claim 16, wherein the data is home location register data.

18. A method as in claim 16, wherein the data is of an alternate route for completing a call.

19. A telecommunication system comprising:

the Internet;

at least two Internet access servers operationally connected to said Internet;

at least one Local Area Network operationally connected to said Internet;

a first personal computer connected to said Local Area Network and being equipped for operation as a telephone;

a second personal computer and a third personal computer, said second and third personal computers being equipped for operation as telephones over the Internet;

a PSTN Gateway Server operationally connected to said Internet;

a telephone operationally connectable to said PSTN Gateway Server;

a Mobile Switching Office operationally connectable to said PSTN Gateway Server;

a wireless personal communications terminal for telephone communication via said Mobile Switching Office;

a Domain Name Server coupled to the Internet;

an Intelligent Service Control Point (ISCP); and a Signaling Transfer Point (STP) providing signaling communications between said Domain Name Server and said ISCP so that data from the ISCP can effect operation of the Domain Name Server and thereby connections in the Internet;

wherein completion of an Internet telephone call from one of said personal computers is delayed for a time period to permit the execution of a telecommunication control function by the Domain Name Server and the ISCP.

20. A telecommunication system as in claim 19, wherein the said telecommunication control function comprises directing of the Internet telephone call for completion at a telephone other than one originally called.

21. A mobile telephone communication system, comprising:

a public packet data network;

a plurality of computers coupled for data communication via the public packet data network, wherein a subset of the plurality of computers include elements providing voice telephone communication capabilities;

a domain name server system coupled to the public packet data network for receiving a domain name query from a calling one of the subset of computers and sending an address back to the calling computer in response to the domain name query;

a public switched wireline telephone network, including a plurality of central office switching systems, an interoffice signaling network and at least one service control point data base coupled to the interoffice signaling network;

a data communication module coupling the domain name server to the interoffice signaling network of the public switched wireline telephone network; and a wireless communication network comprising one or more mobile switching offices coupled to one or more of the central office switching systems.

22. A system as in claim 21, further comprising at least one gateway server coupling the packet data network to one of the central office switching system for processing telephone communication signals for transport over the public packet data network.

23. A system as in claim 21, wherein the public packet data network comprises the Internet.

24. A system for controlling routing of calls through a public packet data network, said system comprising:

a Domain Name Server coupled to the public packet data network for receiving queries from calling computers and sending addresses in responses back to the calling computers, said Domain Name Server including a domain name to address translation table and running software to execute a conditional analysis in response to a domain name query before transmitting an address back in a response; and a data communication module for coupling the Domain Name Server to an interoffice signaling network of an intelligent public switched telephone network for obtaining at least some information from a node of an intelligent public switched telephone network.

25. A system for controlling routing of calls through a public packet data network to roaming telephone service subscribers, said system comprising:

a Domain Name Server coupled to the public packet data network for receiving queries from calling telephone capable computers and sending addresses in responses back to the calling computers, said Domain Name Server including a domain name-to-address translation table and running software to execute a conditional analysis in response to a domain name query before transmitting an address back in a response, wherein under some call conditions, the conditional analysis identifies a destination address for a roaming subscriber; and a data communication module for coupling the Domain Name Server to an interoffice signaling network of an intelligent public switched telephone network for obtaining at least some information relating to the conditional analysis or the destination address from a node of an intelligent public switched telephone network.

26. A system as in claim 25, wherein the data communication module provides an interface to an SS7 type common channel interoffice signaling link.

27. A telecommunications system comprising:

an interlinked data network creating an Internet functionally connectable to wireless communication systems;

said network having a Domain Name Server system which receives textual domain names from an access server at a first time, T1, said Domain Name Server system including means for sending a response to said access server at a second time, T2; and means for executing a telecommunication rousing control function during the period of time between T1 and T2, to determine the nature of the response back to the access server.

28. A telecommunication system as in claim 27, wherein said control function includes querying a called telephone equipped computer to determine if it is ready to receive an incoming call.

29. A telecommunication system as in claim 28, wherein said control function further includes responding to the access server with an Internet Protocol (IP) address of a PSTN Gateway,Server if the called telephone equipped computer is not ready to receive an incoming call.

30. A telecommunications system as in claim 28, wherein said control function includes preparing a response to the Internet access server with an Internet Protocol (IP) address of a computer other than the called telephone equipped computer.

31. A method for providing telephone services over the Internet comprising:

providing SS7 signaling links from a Domain Name Server coupled to the Internet to an intelligent telephone network;

delaying for a time period a response to an Internet telephone, which telephone is querying the Internet Domain Name Server for translation of a domain name;

during said time period, obtaining data over the SS7 links from the intelligent telephone network for executing a call; and transmitting the response including information dependent on the data.

32. A method comprising:

receiving a domain name query at a server coupled to a public packet data network;

executing a conditional analysis in response to the domain name query;

if the conditional analysis produces a first result, translating a domain name included in the query into a first destination address;

if the conditional analysis produces a second result, obtaining control information from a routing control database of a public switched telephone network and generating a second destination address based on the control information; and transmitting a response message containing the first or the second destination address to a calling terminal for use in establishing communication at least partially through the public packet data network.

33. A method as in claim 32, wherein the second destination address relates to call routing via the public switched telephone network.

34. A method as in claim 32, wherein the second destination address relates to call routing via a mobile telephone system providing wireless communications.

35. A method as in claim 32, wherein the control information is obtained from a home location register for a called party maintained in the routing control database.

36. A method as in claim 32, wherein the public packet data network comprises the Internet.

37. A method as in claim 32, wherein the first address comprises a TCP/IP address.

38. A method as in claim 32, wherein the second address comprises a TCP/IP address.

39. A method as in claim 32, wherein the second address comprises a telephone number.

40. A method as in claim 39, wherein the telephone number comprises a directory number assigned within the public switched telephone network.

41. A method as in claim 39, wherein the telephone number comprises a temporary local directory number assigned by a wireless mobile communication system.

* * * * *